United States Patent [19]
Glugla et al.

[11] Patent Number: 5,650,479
[45] Date of Patent: Jul. 22, 1997

[54] INTERFACIALLY POLYMERIZED POLYESTER FILMS

[75] Inventors: Paul G. Glugla; Gregory K. Rickle, both of Midland; Bethanne L. Smith, Freeland; Stephen E. Bales, Midland, all of Mich.

[73] Assignee: The Cynara Co., Houston, Tex.

[21] Appl. No.: 468,839

[22] Filed: Jun. 6, 1995

[51] Int. Cl.$^6$ ............................................. C08G 63/02
[52] U.S. Cl. ............................ 528/194; 95/43; 95/54; 210/500.21; 210/500.26; 528/176; 528/193
[58] Field of Search ............ 210/500.21, 500.26; 95/43, 54; 528/176, 193, 194

[56] References Cited

U.S. PATENT DOCUMENTS

| | | | |
|---|---|---|---|
| 4,493,714 | 1/1985 | Ueda et al. | 95/54 |
| 4,781,733 | 11/1988 | Babcock et al. | 95/54 |
| 4,822,382 | 4/1989 | Nelson | 95/54 |
| 4,840,646 | 6/1989 | Anand et al. | 95/54 |
| 4,851,014 | 7/1989 | Jeanes | 95/54 |
| 4,994,095 | 2/1991 | Kawakami et al. | 95/54 |
| 5,049,167 | 9/1991 | Castro et al. | 95/54 |
| 5,177,296 | 1/1993 | Sartori et al. | 585/819 |
| 5,246,587 | 9/1993 | Tomasche | 210/654 |
| 5,271,843 | 12/1993 | Chau et al. | 310/654 |

*Primary Examiner*—Terressa Mosley
*Attorney, Agent, or Firm*—Peters, Verny, Jones & Biksa, L.L.P.

[57] ABSTRACT

The present invention concerns a polyester gas separation membrane which is obtained by the interfacial polymerization of benzenetricarbonyl trihalide or benzene tetracarbonyl tetrahalide in a water-insoluble organic solvent in one phase and a variety of polyfunctional phenols present as the di- or tri-salt in a mixture of water and phase transfer agent and a water-soluble organic solvent in the second phase. The present invention also includes the polyester membrane itself, its methods of preparation and the use of the membranes to separate gas mixtures, such as carbon dioxide and methane, helium and methane and the like.

23 Claims, 5 Drawing Sheets

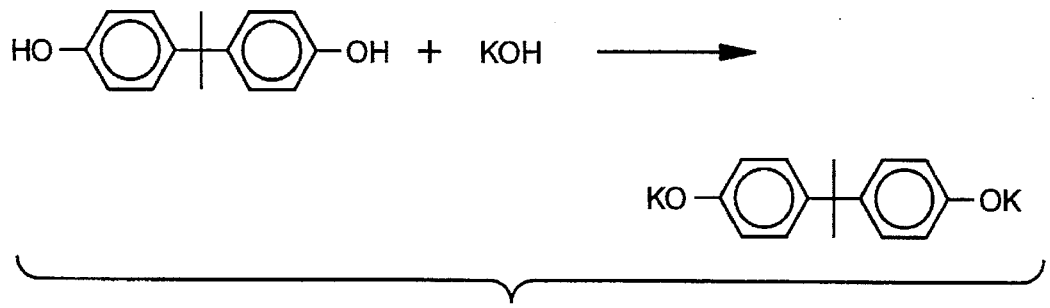
FIG._1A
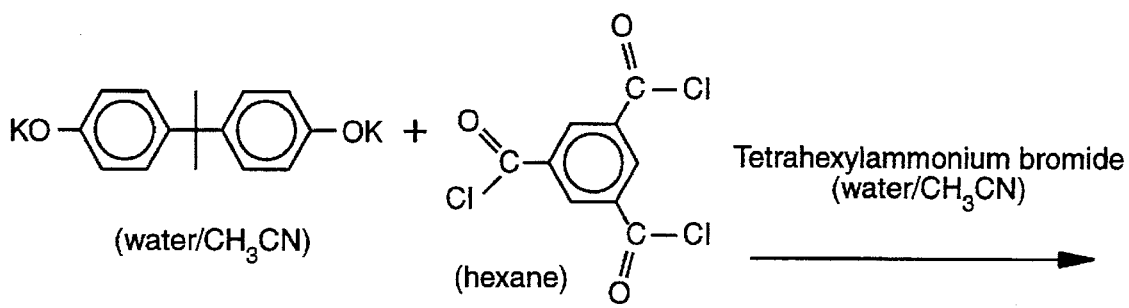
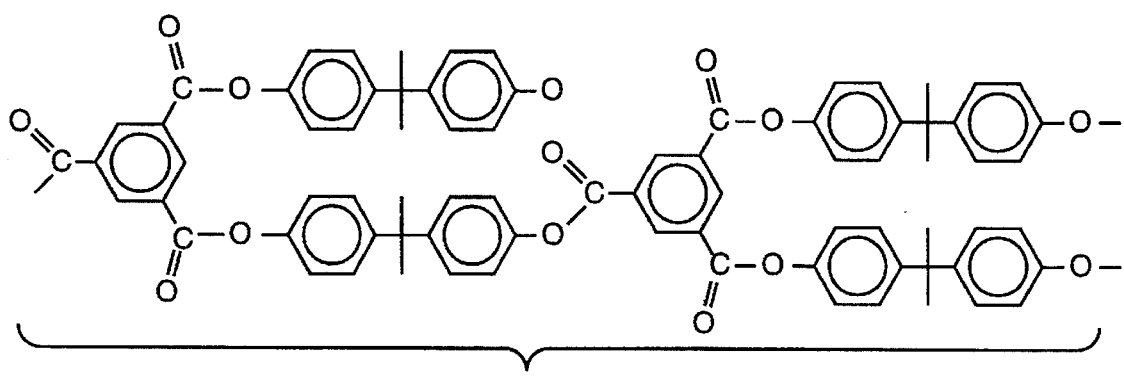
FIG._1B
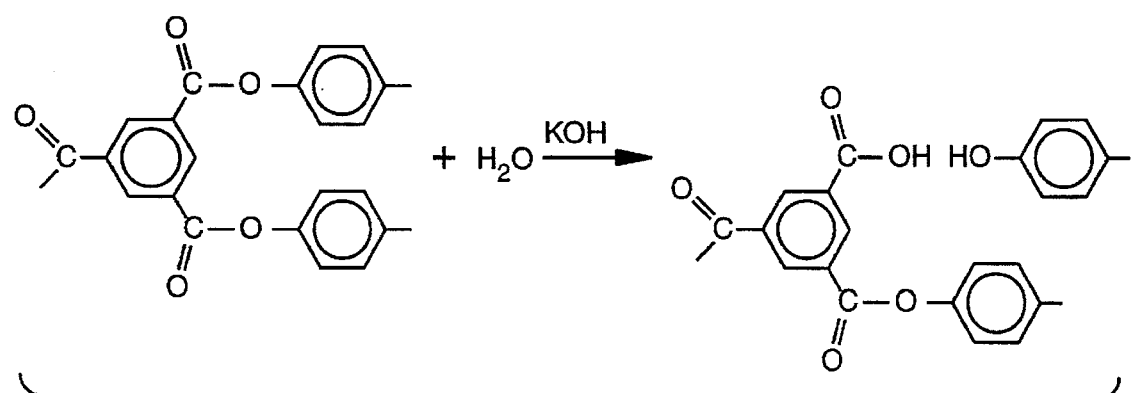
FIG._1C

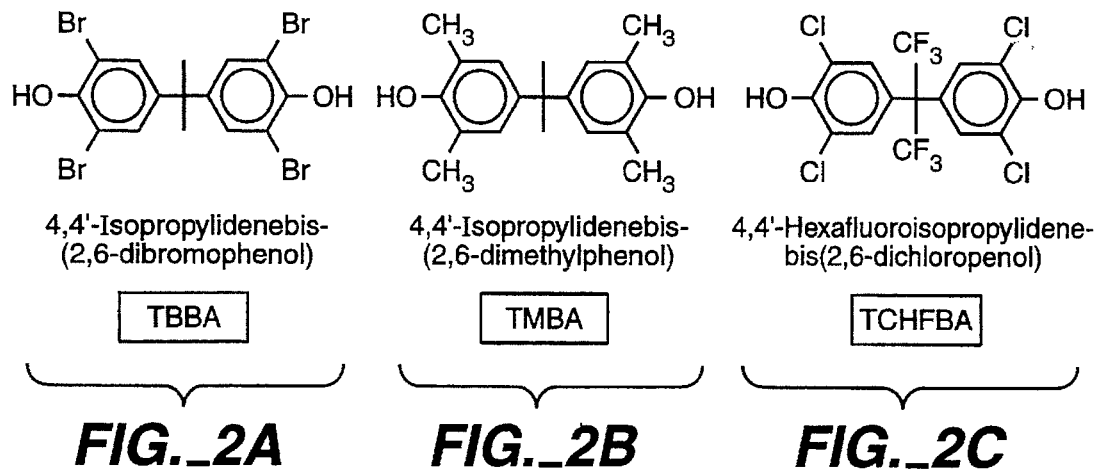
FIG._2A     FIG._2B     FIG._2C
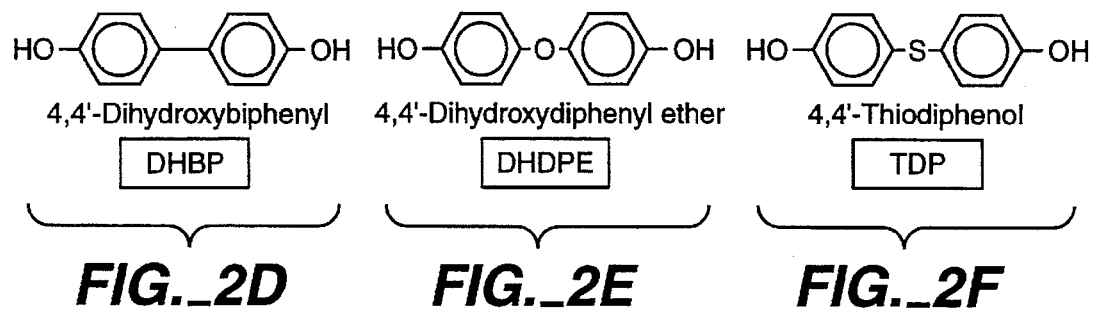
FIG._2D     FIG._2E     FIG._2F
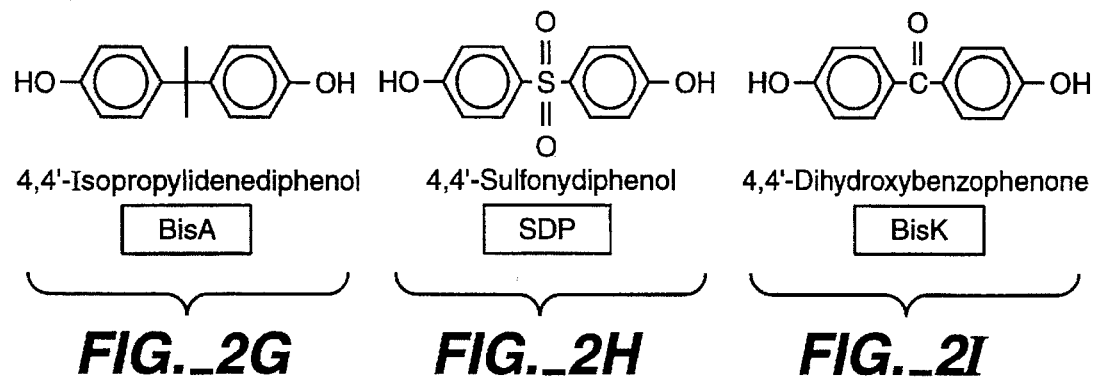
FIG._2G     FIG._2H     FIG._2I

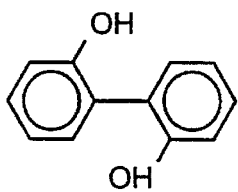
2,2'-Biphenol
BP
*FIG._2J*
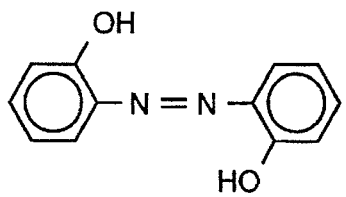
2,2'-Dihydroxyazobenzene
DHAB
*FIG._2K*
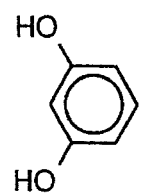
Resorcinol
RES
*FIG._2L*
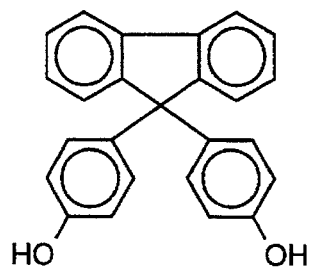
9,9'-Bis(4-hydroxyphenyl)-fluorene
BHPF
*FIG._2M*
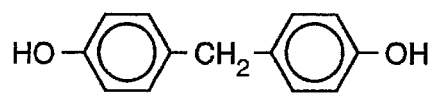
Bis-(4-hydroxyphenyl)methane
BisF
*FIG._2N*
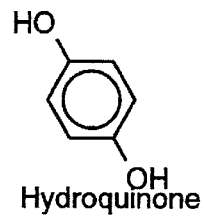
Hydroquinone
HQ
*FIG._2O*

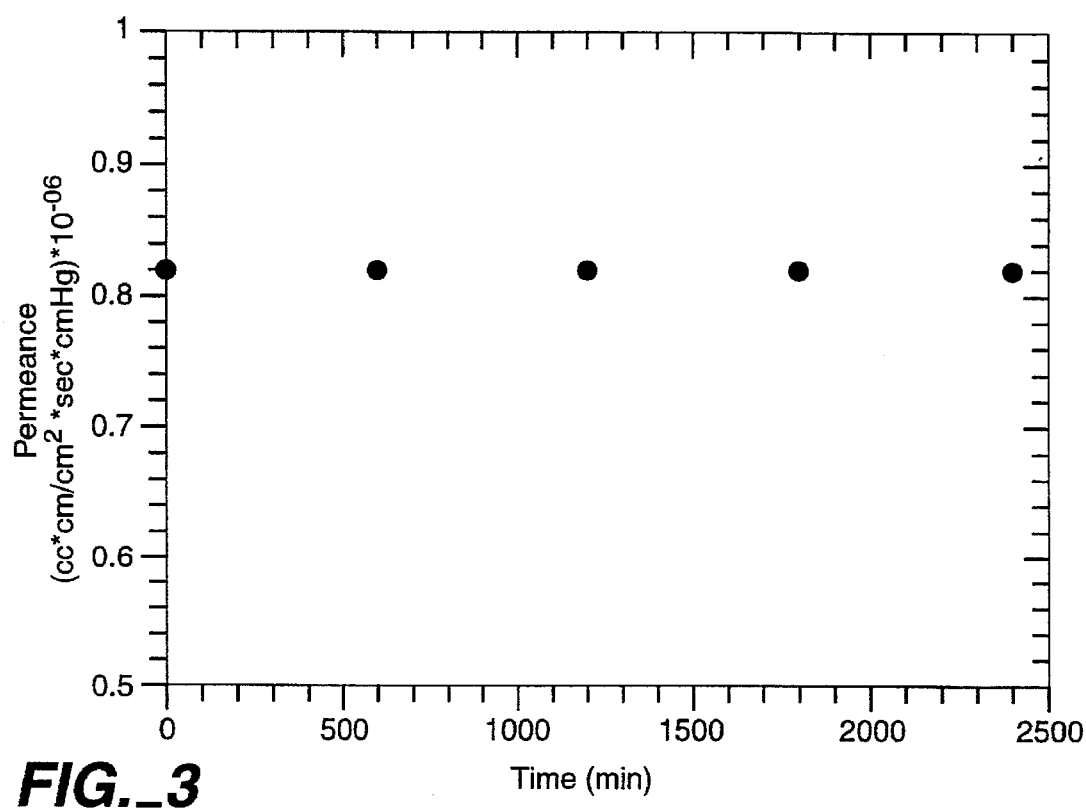
FIG._3
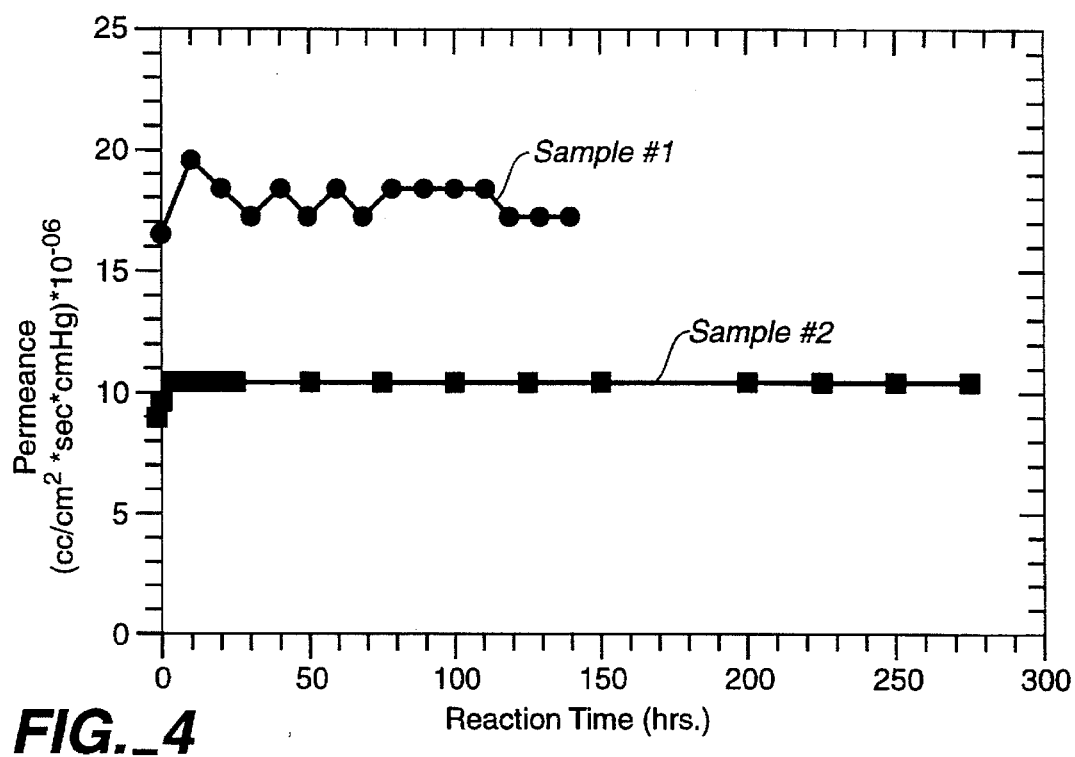
FIG._4

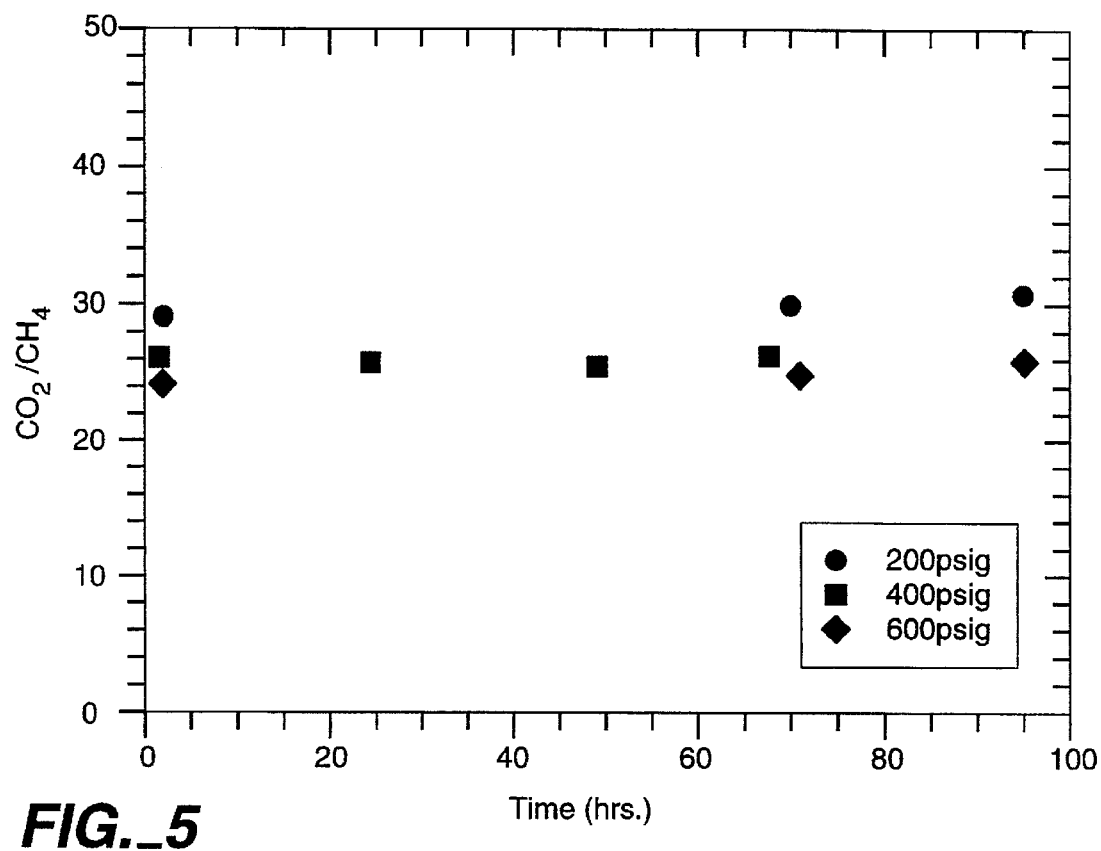
FIG._5
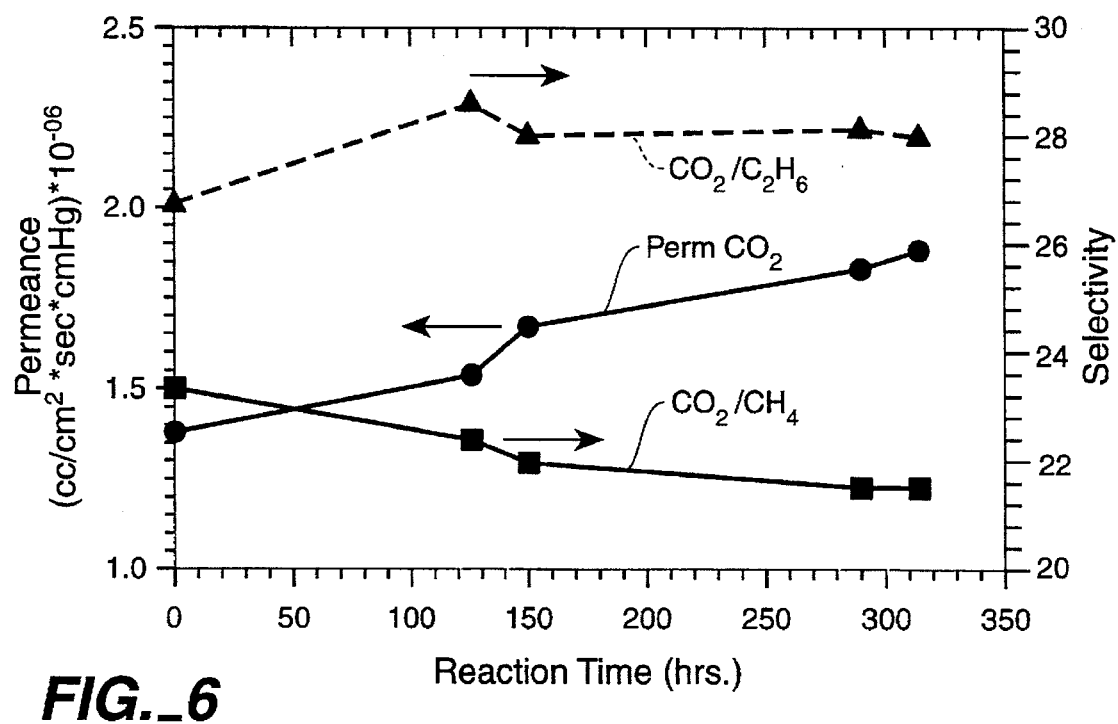
FIG._6

INTERFACIALLY POLYMERIZED POLYESTER FILMS

BACKGROUND OF THE INVENTION

1. Field of the Invention

The present invention concerns polyester gas separation membranes which are obtained by the interfacial polymerization (IFP) of benzenetricarbonyl trichloride or benzenetetracarbonyl tetrachloride in a water-insoluble organic solvent in one phase and a variety of difunctional phenols present as the di-alkali metal salt in a mixture of water and a phase transfer catalyst and a water-soluble organic solvent in the second phase. The present invention also includes the polyester membrane itself, its methods of preparation and the membranes as used to separate gas mixtures, such as carbon dioxide and methane, helium and methane and the like.

2. Description of the Related Art

Any commercial gas membrane must be strong and have useful transport properties. In composite membranes, the functions of strength and attractive transport properties are optimized by incorporating two separate polymer layers—a porous support covered by a continuous non-porous discriminating layer. The support provides the strength, but provides little or no separation power or resistance to gas flow. The discriminating layer provides useful transport properties and virtually all of the resistance to flow. The discriminating layer must be thin to achieve the maximum transport rate. Its thickness is limited by the size of the pores in the support. The discriminating layer must be thick enough and strong enough so that when deposited over the largest pore in the support and subjected to an applied pressure, it resists breaking. Obviously, the polymer that makes up the discriminating layer must have good film forming properties, which usually is associated with chain entanglement or crosslinking. Composite membranes are often made by the IFP method. For example, reverse osmosis (RO) membranes are prepared by a process in which an aqueous solution of metaphenylenediamine or another multifunctional polyamine is put into the pores of a membrane support. The 1,3,5-trimesoyl chloride (TMC) solution is washed over the wet support. If done correctly, a thin film of crosslinked polymer is produced on the support. The IFP method produces polymer with good film forming properties because the film is crosslinked. The thickness of the discriminating layer is limited because the polymerization slows after the water/organic interface is sealed. This results in thin, strong, leak-free composite membranes.

Interfacial polymerized (IFP) membranes are useful in fluid separations. FilmTec, a Dow Chemical Company subsidiary in Minneapolis, Minn. currently makes water purification membranes using the IFP method. The FilmTec membranes have been optimized for liquid water purification, but presently do not have industrially interesting gas separation or transport properties. However, there may be advantages of the IFP method which are beneficial for membranes used in gas separations. No one thus far has reported the polyester membrane of the present invention for gas separations.

FT30 is a commercial reverse osmosis (RO) membrane manufactured by FilmTec. It is made through the interfacial polymerization of meta-phenylene diamine (MPD) with 1,3,5-benzenetricarbonyl trichloride (TMC for trimesoyl chloride) (see U.S. Pat. No. 4,277,344) producing a crosslinked polyamide. The reverse osmosis (RO) membrane, FT30 (polyamide), when tested for gas separations has extremely high transport rates and low selectivities. FT30 gas transport measurements show water vapor flux of greater than $3.0*10^{-03}$ cc/cm$^{2*}$ sec* cmHg which is the limitation of the gas testing apparatus, with little or no selectivity for other gases present or tested. The permeance of the other gases (which are normally faster than water) were not determined because the water overwhelmed the equipment. The selectivity was not determined. The crosslinking and the stiffness of the polymer chains in FT30 probably produce many gas transport channels that are too large to discriminate between gas molecules. Very flexible polymers produce membranes with either low flux or poor selectivity i.e. $CO_2/CH_4$ selectivity<30. Therefore, polymer flexibility must be modulated carefully.

The following art is of general and specific interest.

J. N. Anand et al., in U.S. Pat. No. 4,840,646 disclose a method of preparing a linear polyestercarbonate wherein the diphenolic portion is a tetrabromodiphenol residue. The membranes produced by these polymers have good mechanical properties and are useful in gas separations.

T. O. Jeanes, in U.S. Pat. No. 4,851,014 discloses the preparation of linear polycarbonates, polyesters and polyestercarbonates containing tetrafluorobisphenol-F. The membranes of these polymers are useful in gas separations.

J. H. Kawakami et al., in U.S. Pat. No. 9,994,095 disclose the preparation of a defined linear polyester of 4,4'-(IH-alkylidene)-bis[2,3,6-trialkylphenol] and aromatic acids. The membranes of these polymers are useful in gas separations.

F. Ueda et al., in U.S. Pat. No. 4,493,714 teach the preparation of ultrathin film and its use for concentrating a specified gas in a gas mixture. Polyamines composed of silicon-containing polyamines are combined within polyisocyantes.

W. C. Babcock et al., in U.S. Pat. No. 4,781,733 teach the preparation and use of semi-permeable thin-film membranes of siloxane, alkoxysilyl and aryloxysilyl oligomers and copolymers. Some of the polymers for reverse osmosis (RO) are produced using interfacial polymerization.

J. K. Nelson, in U.S. Pat. No. 4,822,382 discloses the preparation of composite membranes and their use in the separation of gases. The composite membrane has a separation layer of difunctional poly(tetramethyl)bisphenol A phthalate.

R. P. Castro et al., in U.S. Pat. No. 5,049,167 disclose the formation of polyamide membranes using interfacial polymerization. The polyamine monomers are reacted with toluene-2,4-diisocyanate or 1,3,5-benzene tricarbonyl trichloride. No polyalcohol monomers are described or suggested to produce polyesters. These polyamine polymers are useful as membranes for the separation of gases.

G. Sartori et al., in U.S. Pat. No. 5,177,296 teach the preparation of linear polyesters and the thermal crosslinking of the membranes formed from the polymers. The membranes are used to separate aromatic organic compounds from saturated organic compounds.

M. M. Chou, et al. in U.S. Pat. No. 5,271,843 disclose a semipermeable membrane which is useful for reverse osmosis. The membrane is a polyamide produced by the interfacial polymerization on a support of a polyamine and an aromatic polyacyl halide.

J. E. Tomasche in U.S. Pat. No. 5,246,587 discloses a water permeable reverse osmosis membrane. The membrane is a polyamide formed by interfacial polymerization on a support of a polyamine and an aromatic polyacyl halide.

None of the art cited herein individually or in combination teach or suggest the present invention.

It is apparent that a need exists for improved polyester membranes for improved separation of mixtures of gases. Difunctional phenol chemistry is attractive because many monomers of varying rigidity were available. Furthermore, S. Bales et al., U.S. Pat. No. 4,840,646 show that non-crosslinked polyesters based on biphenols generally have interesting selectivities in the separation of gases.

In the present invention, (1) crosslinked polyester membranes having glassy polymer characteristics have both a high selectivity for gas separations and high flux; (2) high selectivity demonstrated by these novel compositions is surprising and unexpected because all prior art using rubbery polymers inherently has low selectivities; (3) these novel glassy membranes have the added advantages of being resistant to flux losses at high pressures and at elevated temperatures; (4) highly crosslinked glassy polymer membranes made by interfacial polymerization generally or previously yielded membranes with substantially lower selectivity than the linear polymers; and (5) crosslinking of linear polymers produces large flux losses which are a disadvantage.

The present invention provides the improvements in membranes for separation of gases as is described herein below.

SUMMARY OF THE INVENTION

The present invention relates to a crosslinked polyester polymer in the form of a membrane as prepared by interfacial polymerization; the polymer has the general structure:

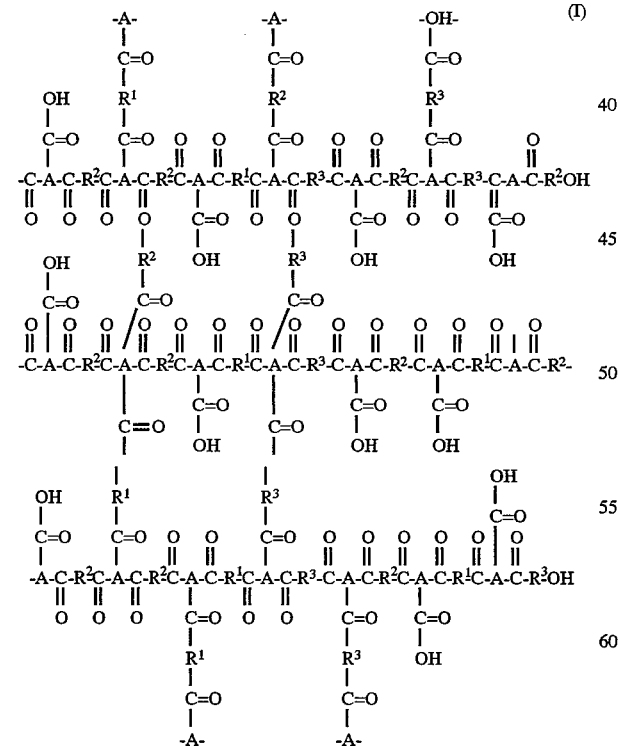

or

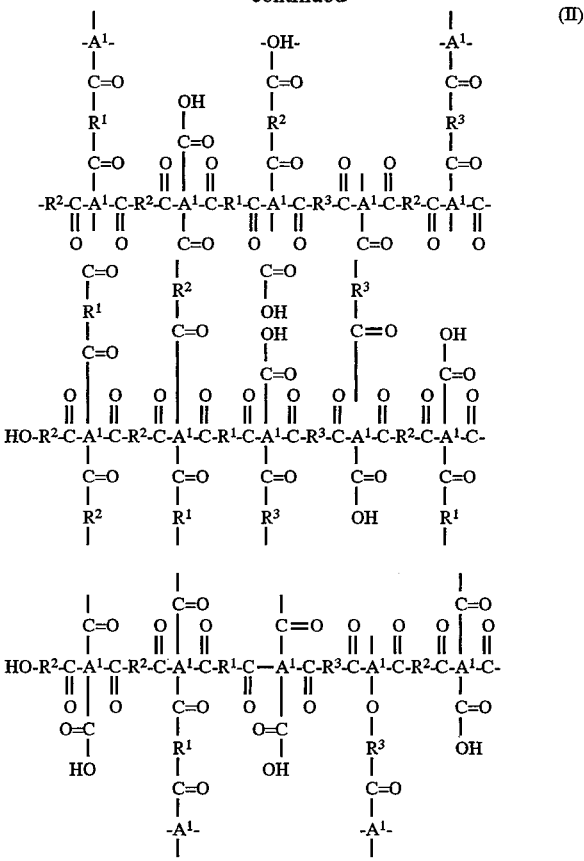

wherein

A is selected from the group consisting of;

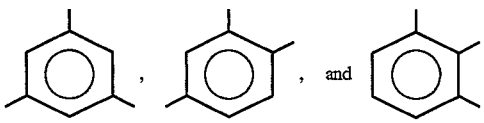

$A^1$ is selected from the group consisting of;

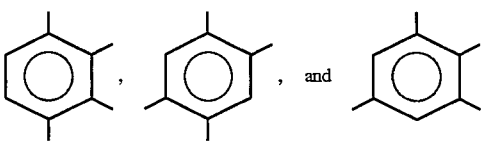

$R^1$, $R^2$, and $R^3$ are each independently selected from one or more difunctional aromatic groups $—O—Q^1—O—$, $—O—Q^2—O—$, or $—O—Q^3—O—$, wherein $Q^1$, $Q^2$, and $Q^3$ each independently contain 1–4 aromatic groups, which aromatic groups are optionally connected by a direct bond, $—CH_2—$, $C(CH_3)_2$, $C(CF_3)_2$,

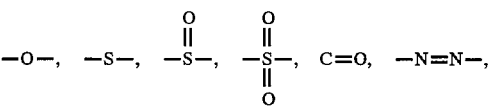

-continued
—CH=CH—, —C≡C—, —N(R¹²)—, wherein R¹² is CH₃ or CH₃CH₂—, and

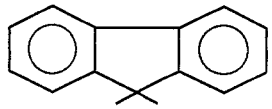

wherein the oxygen atoms are attached directly to the same or a different aromatic ring.

In a preferred embodiment, in the crosslinked polyester polymer, R¹, R², and R³ are identical, and Q¹, Q², and Q³ are identical.

In another embodiment, in the crosslinked polyester polymer, R¹, R², and R³ are selected from the group consisting of —O—Q¹—O, —O—Q²—O—, and —O—Q³—O— wherein each Q¹, Q², and Q³ are independently selected from:

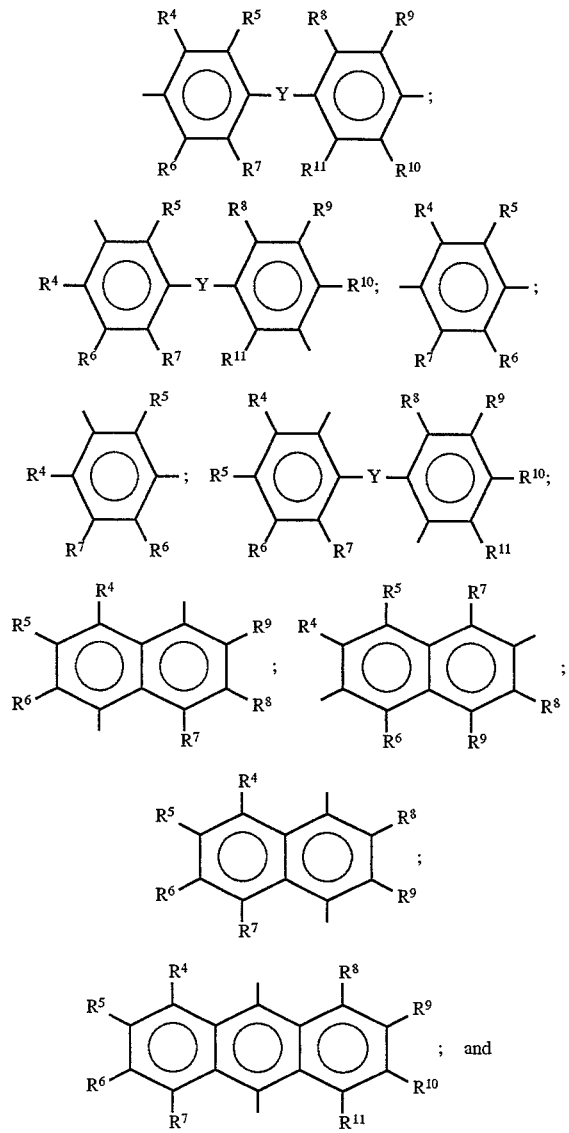

-continued

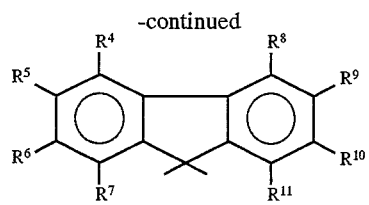

wherein
R⁴, R⁵, R⁶, R⁷, R⁸, R⁹, R¹⁰, and R¹¹ are each independently selected from H, CH₃, CH₃CH₂, F, Cl, or Br; and
Y is selected from the group consisting of a direct bond,

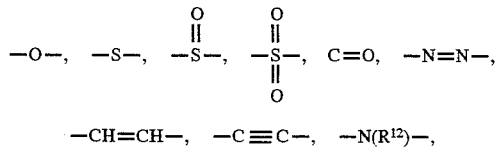

—CH=CH—, —C≡C—, —N(R¹²)—, wherein R¹² is CH₃ or CH₃CH₂— and

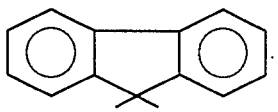

In another embodiment, the present invention relates to a process for producing a gas permeable polyester membrane, which process comprises:

a) interfacially polymerizing (i) an essentially monomeric aromatic group containing reactant having two alkali metal phenoxy functional groups per reactant molecule in a mixture of water and a water soluble polar organic solvent, and (ii)

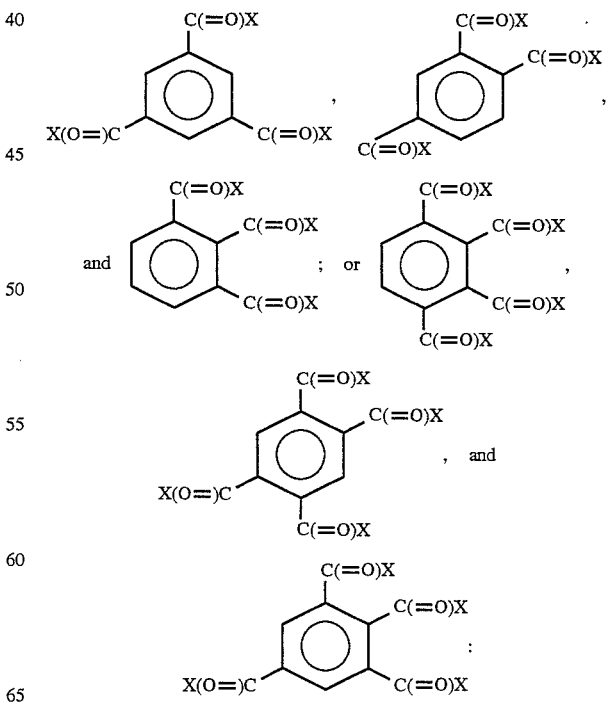

wherein X is chloro or bromo, in one or more water immiscible solvents at a temperature of between about 0° and 90° C. for between about 2 sec and 3 hr in the presence of a phase transition catalyst, b) removing the polymer membrane formed at the interface surface of the immiscible liquids formed in step (a);

c) quenching the polymer formed in step (b) in one or more organic solvents optionally in the presence of water at ambient conditions for between about 0.1 sec and 10 min; and d) drying the polymer of step (c).

In preferred embodiments, in step (b) the membrane is formed on a support during the polymerizations or is removed after polymerization on a supporting structure.

In preferred embodiments in step (c), the quenching of the polymer membrane occurs at between 1 and 300 seconds, more preferably between 1 and 60 sec.

In preferred embodiments in step (d), the drying of the quenched polymer membrane occurs between about ambient temperature and 120° C., between ambient pressure and 1 milli torr and between about 30 min and 24 hr.

Preferably the drying of the polymer of step (d) occurs about ambient temperature between 14 and 20 hr, or between 50° and 100° C. in a vacuum of between about ambient (atmospheric pressure) and 1 milli torr.

In a preferred embodiment of the process, in step (a) $R^1$, $R^2$, and $R^3$ are selected from the group consisting of the disodium or dipotassium salts of —HO—$Q^1$—OH, —HO—$Q^2$—OH—, and —HO—$Q^3$—OH wherein each $Q^1$, $Q^2$, and $Q^3$ are each independently selected from:

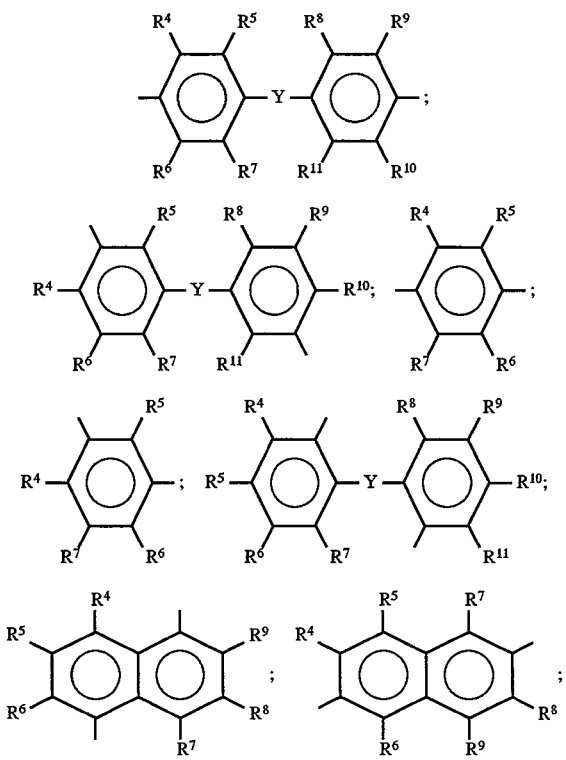

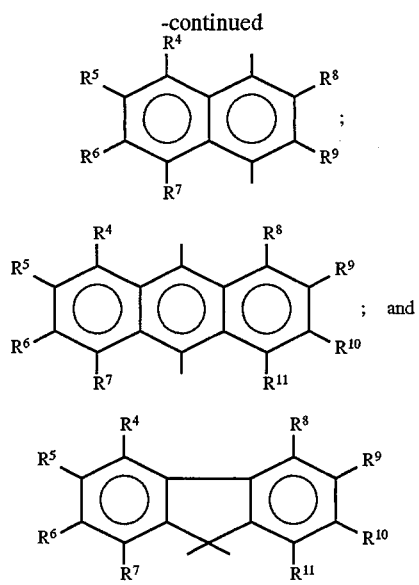

wherein
$R^4$, $R^5$, $R^6$, $R^7$, $R^8$, $R^9$, $R^{10}$, and $R^{11}$ are each independently H, $CH_3$, $CH_3CH_2$, F, Cl, or Br, and Y is selected from the group consisting of a direct bond, —$CH_2$—, $C(CH_3)_2$, $C(CF_3)_2$,

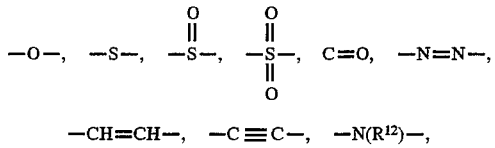

—CH=CH—, —C≡C—, —N($R^{12}$)—, wherein $R^{12}$ is $CH_3$ or $CH_3CH_2$— and

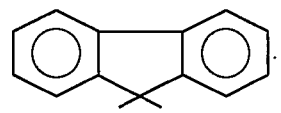

In another embodiment of the process the monomeric aromatic group containing reactant having two sodium or potassium phenoxy functional groups per reactant molecule is selected from the sodium or potassium salts of difunctional phenols selected from the diphenols of FIG. 2.

In still another embodiment, the present invention relates to a process for the selective gas separation of a mixture of gases, which process includes:

A) contacting the mixture of gases under pressure with one surface of a membrane of the polymer described herein; and B) removing the gas which permeates selectively through the membrane.

In yet another embodiment, the present invention relates to a process for the selective gas separation of a mixture of gases, which process includes:

A) contacting the mixture of gases under pressure with one surface of a membrane produced by the process of Claim 12; and B) removing the gas which permeates selectively through the membrane.

Preferably the mixture of gases is primarily a mixture of gases selected from $H_2$, $N_2$, $CO_2$, $CH_4$, helium, oxygen, water, and $CH_3CH_3$.

BRIEF DESCRIPTION OF THE FIGURES

FIG. 1A is a reaction sequence for the formation of the diphenol disalt.

FIG. 1B is a reaction sequence for the present interfacial polymerization using BisA as the difunctional aromatic phenol. Any of the difunctional phenols described herein are used in this polymerization.

FIG. 1C is a reaction sequence showing the hydrolysis of the formed crosslinked polymer in the presence of aqueous base.

FIGS. 2A to 2O are the structures and acronyms of the monomeric diphenols used in the polymerization sequence of FIG. 1.

FIG. 3 is a graph showing the nitrogen permeance versus time (min) for the DHBP polyester membrane. (Pure nitrogen is at 1200 psig.)

FIG. 4 is a graph of carbon dioxide permeance versus time (min) for the DHBP polyester membrane for two identical samples, Sample 1 and Sample 2. The pure dry carbon dioxide is feed gas supplied at 600 psig.

FIG. 5 is a graph of carbon dioxide/methane selectivity versus time (hr) and pressure, at 200 (●), 400 (■), and 600 (♦) psig for the DHBP polyester membrane. The feed gas was a 50/50 mixture of carbon dioxide/methane and was dry.

FIG. 6 is a graph of carbon dioxide/methane selectivity (■) and the carbon dioxide/ethane selectivity (▲) versus time (hr) for the DHBP polyester membrane. The carbon dioxide permeance is shown as (●). The feed gas consisted of 42% methane, 50% carbon dioxide, 7.5% ethane, 0.5% propane, traces of butane, and was dry. The feed pressure was 600 psig.

DETAILED DESCRIPTION OF THE INVENTION AND PREFERRED EMBODIMENTS

Definitions

As used herein:

"Alkali metal" refers to lithium, sodium, potassium, cesium or rubidium. Sodium and potassium are preferred, especially potassium.

"BCHFBA" refers to 4,4'-hexafluoroisopropylidene-bis (2,6-dichlorophenol).

"BHPF" refers to 9,9'-bis(4-hydroxyphenyl)-fluorene.

"BisA" refers to 4,4'-isopropylidenediphenol.

"BisF" refers to bis-(4-hydroxyphenyl)methane.

"BisK" refers to 4,4'-dihydroxybenzophenone.

"BP" refers to 2,2'-biphenol.

"DHAB" refers to 2,2'-dihydroxyazobenzene.

"DHBP" refers to 4,4'-dihydroxybiphenyl.

"DHDPE" refers to 4,4'-dihydroxydiphenyl ether.

"Diphenol" refers to any organic structure phenyl, biphenyl, naphthyl, etc. connected by covalent bonds having two hydroxyl groups. Preferred diphenols are described in FIG. 2 and claimed herein. Preferred diphenols are 4,4'-dihydroxybiphenyl or 4,4'-isopropylidinebis-(2,6-dibromophenol). More preferred is 4,4'-dihydroxybiphenyl.

"Electrophile solvents" refer to non-polar immiscible with diolphase, solvents that will also at least dissolve partially the nucleophilic reactant (the nucleophilic phase transfer catalyst complex). Preferred solvents include alkanes, cycloalkanes, chlorofluorocarbons, hydrochlorofluorocarbons, ISOpAR™s (high purity paraffin mixtures) ethers, aromatics and mixtures thereof. Preferred solvents include alkanes, FREONS and ISOPARS™.

"HQ" refers to hydroquinone.

"Membrane support" refers to any porous inert material which will survive the solvents used, having a preferred pore size range of 0.01μ to 10μ and a most preferred range of 0.01μ to 0.5μ. Crystalline polymers such as NYLON-6,6, NYLON-6, polypropylene, polyethylene, poly(ether ether ketone), poly(aryl sulfide), polyvinylidine fluoride and the like are suitable support materials.

"Phase transfer agent" refers to organic ammonium halides wherein organic is alkyl, cycloalkyl, aryl or combinations thereof. The phase transfer agent must be soluble in one or both phases, and the phase transfer agent-diol salt complex must not precipitate from the aqueous solution. Preferred agents include, for example, tetramethylammonium bromide, tetraethylammonium bromide, tetrabutylammonium bromide, tetrahexylammonium bromide, tetraoctylammonium bromide, or tetraphenylphosphonium bromide. The most preferred agent is tetrahexylammonium bromide.

"Phenol phase solvent" refers to solvents having limited miscibility in the second phase. Preferred solvents include acetonitrile, 2-propanol, dioxane, triglyme, ethanol and combinations thereof. More preferred solvents are acetonitrile, 2-propanol or mixtures thereof.

"Quench liquid" refers to the liquids the porous membrane is contacted with to remove unwanted liquids or solids. Preferred quench liquids include water, hexane, acetonitrile, acetone, isopropanol, and combinations thereof. More preferred liquids include acetonitrile, isopropanol or mixtures thereof, and acetonitrile is most preferred.

"RES" refers to resorcinol.

"SDP" refers to 4,4'-sulfonydiphenol.

"TBBA" refers to 4,4'-isopropylidenebis-(2,6-dibromophenol).

"TDP" refers to 4,4'-thiodiphenol.

"TMBA" refers to 4,4'-isopropylidenebis-(2,6-dimethylphenol).

"Triphenol" refers to any organic aromatic structure having three —OH groups on an aromatic ring.

In the present invention, the following points are of interest:

1. The crosslinked polyester membranes having glassy polymer characteristics have both a high selectivity for gas separations and high flux.

2. The high selectivity demonstrated by these compositions is surprising and unexpected because all prior art using rubbery polymers inherently have low selectivities. These glassy membranes have the added advantages of being resistant to flux losses at high pressures and at elevated temperatures.

3. For glassy polymers, the highly crosslinked membranes made by interfacial polymerization generally or previously yielded membranes with substantially lower selectivity than the linear polymers. The crosslinking of linear polymers produces large flux losses which are a disadvantage.

4. A process for making the glassy membranes includes interfacial polymerization using a phase transfer agent, contacting the membrane with a supporting material, followed by a post reaction quench to stabilize the membrane, all of which are necessary steps to obtain a stable permeable membrane.

The description below is primarily for polymerization of monomers, such as disubstituted phenols. It is to be understood that trifunctional phenols are included in this invention.

The description below is also primarily for trisubstituted aromatic acid trihalides. It is to be understood that the tetrasubstituted aromatic acid tetrahalides react in the same way and are included in this invention.

Mixtures of di- or trifunctional phenols or difunctional or trifunctional aryl acyl halides are part of the present invention. For example, difunctional acyl halides with tri- or tetrafunctional phenols are contemplated.

The interfacial polycondensation from diphenols and trimesoylchloride (TMC) involves three primary reactions. The reactions are shown in FIGS. 1A, 1B and 1C. A list of the typical diphenols that were used is shown in FIG. 2. FIG. 1A shows the formation of the dipotassium salt of BisA in aqueous media. This diphenol can be replaced by any available di- or tri-phenol. FIG. 1B shows the IFP reaction of the diphenol as the dipotassium salt in water/solvent, e.g. water/acetonitrile, with TMC in hexane in the presence of the phase transfer catalyst tetrahexylammonium bromide. A commercially available quarternary ammonium salt is added to the water/solvent solution to increase the rate of polymerization ("see Condensation Polymers", Paul Morgan, Interscience (1965), pages 163–200).

The reaction of FIG. 1B is the polymerization reaction in which the phenol reacts with TMC producing a crosslinked polyester and lithium, sodium, potassium or ammonium chloride.

The third reaction shown in FIG. 1C, the hydrolysis of the crosslinked polyester in aqueous potassium hydroxide, competes with the polymerization yielding the diphenols and organic acids. This third reaction is generally slower than the polymerization. However, as the monomer concentrations become smaller and the polymerization slows, the rate of polymerization becomes equal to the hydrolysis rate. If given enough time, the polymer formed will saponify to low molecular weight fragments, disintegrate, and is not useful as a gas separation membrane.

In the reaction sequences of FIGS. 1A, 1B and 1C, the lithium, sodium or potassium salts of the phenol have a high solubility in the aqueous phase and have very low solubility in the organic phase. Similarly, the TMC has very little solubility in the aqueous phase. The effect of the phase transfer agent, the ammonium salt, is very important and dramatic. Membranes made with a phase transfer agent are strong. Membranes made without it are fragile.

Therefore, in this type of polycondensation, the phenol must diffuse through the existing polymer for any acylation reaction to take place. The TMC simply diffuses to the liquid-polymer interface. Several factors affect the film thickness, i.e., 1) the duration of the polymerization; 2) the solvent; and 3) the type of quaternary ammonium salt. The choice of phase transfer agent and the choice of organic solvent are critical. That is, the combination of reactants under conditions which are similar to those of the polyamide formation (e.g. U.S. Pat. No. 4,840,646), results in membranes which cannot be used for separation of gases. The phase transfer agent is believed to form a compound with the phenol which is more soluble in the polymer/solvent phase than is the lithium, sodium or potassium salt. Thus, contact with the acid chloride is promoted and the polymerization rate increases to a useful rate. The by-product salt is then extracted by the aqueous phase and the cationic part of the phase transfer agent is free to follow the cycle again. The choice of solvent also plays a critical role since solvents that swell the polymer promote monomer transport. This reaction system has many aspects for further optimization. The variables that were extensively explored were monomer type, solvent concentration, reaction time, reaction temperature, quench solvent, and polishing reactions. The choice depends upon the specific phenol(s) used and the solubility of the PTC/phenol salt.

TABLE 1

GROSS MEMBRANE PHYSICAL PROPERTIES

| Monomer | High KOH Concentration (Base 1) | Low KOH Concentration (Base 2) |
| --- | --- | --- |
| TBBA | Thick, clear, strong | Thick, clear, strong |
| TMBA | Thick, clear, strong | Thick, clear, strong |
| TCHFBA | Thin, clear | |
| DHBP | | Thick, clear, strong |
| DHDPE | Thick, clear, strong | Thick, clear, strong |
| TDP | Thick, clear, strong | Thick, clear, strong |
| BisA | Thin, sticky | Thick, clear, strong |
| SDP | Yellow, hydrolyzed | Thin, white |
| BisK | Hydrolyzed | Thin, clear, tore easily |
| BP | Yellow, hydrolyzed | Did not form film |
| DHAB | Brown, hydrolyzed | |
| BHPF | Thick, clear, strong | Thick, clear, strong |
| BisF | Hydrolyzed | Thick, clear, strong |
| HQ | Fragile, thin, easy fractured | |
| RES | Film hydrolyzed | |

Choice of Optimum Phase Transfer Agent—THAB

Quaternary ammonium bromide salts are used as phase transfer agents (PTA). When the phenol salts enter the polymer/solvent phase, the ammonium group associates with the phenol leaving potassium bromide behind in the water phase. The ammonium salt of the monomer is more soluble in the polymer/solvent phase than is the potassium salt of the monomer. Addition of the phase transfer agent increases the solubility of the monomer in the TMC solution. Once the monomer reacts with the TMC, the quaternary ammonium ion associates with the chloride ion and diffuses back into the aqueous phase. Addition of phase transfer agent produces dramatically thicker films, with better gas separation properties. The phase transfer agent must promote film growth but not at the expense of inducing stress or brittleness in the membranes. The gas selectivity is probably controlled by stress or brittleness. High levels of stress or brittleness result in leaks and low selectivity. Tetrahexylammonium bromide is the preferred PTA; see Table 2 and Examples 1–4.

TABLE 2

PHASE TRANSFER AGENTS WITH TBBA

| Agent | Acronym | Results |
| --- | --- | --- |
| Tetramethylammonium bromide | TMAB | 16 microns thickness $CO_2/CH_4 = 31$ |
| Tetraethylammonium bromide | TEAB | 38 microns films leaked |
| Tetrabutylammonium bromide | TBAB | 32 microns films leaked |
| Tetrahexylammonium bromide | THAB | 28 microns $CO_2/CH_4 = 36$ |
| Tetraoctylammonium bromide | TOAB | 32 microns $CO_2/CH_4 = 23$ |
| Tetraphenylphosphonium bromide | TPPB | no film formed |
| no agent | TPPB | no film formed |

Aqueous Phase Solvent—Upon addition of the phase transfer agent, the ammonium salt of the monomer may precipitate if the base solution solvent is pure water. An organic solvent is added to dissolve this precipitate. Many solvents were examined (see Table 3 for the list of solvents), and though many solvents proved useful as is shown, acetonitrile or triglyme formed the best films in terms of strength, selectivity, and hydrolysis rate. Most of the solvents that were examined are miscible with hexane. As a result, when the hexane phase is added carefully onto the top of the aqueous phase, the solvent diffuses into the hexane. In many cases, vigorous mixing occurs driven by solvent diffusion into the hexane. Most of the solvents produced a polymer, but because of mixing, a smooth film did not form. Instead, the polymer film obtained was granular, was suspended in the aqueous phase and not useful as a membrane. Acetonitrile is immiscible in hexane and the mixing of the liquids does not occur. For TBBA and DHBP, triglyme produces films that are about as good as the films produced in acetonitrile, even though triglyme is soluble in hexane. Miscibility is generally not a criteria; see Examples 1–4.

TABLE 3

| AQUEOUS PHASE SOLVENTS | * | ** | $CO_2$ PERMEANCE | $CO_2/CH_4$ SELECTIVITY |
|---|---|---|---|---|
| DMF | | | | |
| NMP | | | | |
| DMSO | | | | |
| Acetonitrile** | | ** | $3.55E^{-06}$ | 22 |
| 2-Propanol* | * | | $2.83E^{-06}$ | 12 |
| Acetone | | | | |
| Tetrahydrofuran | | | | |
| Dioxane* | * | | | |
| Ethylene Glycol | | | | |
| Triglyme* | * | | | |
| Ethanol* | * | | | |
| Propylene glycol | | | | |

* produced films with TBBA
** produced the best performing films with TBBA

The gas separation membranes are made through interfacial polymerization. The gas transport properties of the membranes made in this effort are reported in Tables 4, 5, 6 and 7, and also Examples 1–4. The data in Tables 4, 5, 6, 7 and 8 are measured with a gas mixture consisting of carbon dioxide, methane, helium, and water. Typically, the gas composition is equal amounts of carbon dioxide, methane, and helium humidified to 50%, and the system pressure was about 1 atm. The results demonstrate that many monomers yield polymers which have commercially useful gas separation properties. No strong structure/function relationship was postulated or observed between the transport properties and the monomer. The best membranes having useful gas permeation properties and other physical properties were made from DHBP, BisA, BHPF, and TBBA.

The data in Tables 4, 5, 6, and 7 demonstrate that lower potassium hydroxide concentrations produce the highest selectivities. However when potassium hydroxide is excluded from the recipe, the polymerization does not occur at an appreciably rate to produce film formation. A series of other factors also are critical in producing acceptable membranes, many of these factors were mentioned above.

Two factors play a major role in determining the polymerization rate—phase transfer agent and aqueous phase co-solvent. Without a phase transfer agent or an aqueous phase co-solvent, the polymerization rate is not sufficient to form a membrane. Use of the phase transfer agent THAB produced a membrane having the highest gas selectivities. The concentration of the phase transfer agent apparently is not overly critical. However, the selectivities tend to go down as the concentration of phase transfer agent is increased. It appears that a concentration of between about 0.001 and 5 wt % based on the diphenol dipotassium salt is preferred.

TABLE 4

$CO_2/CH_4$ SEPARATION RESULTS[a]
(MEMBRANES MADE FROM MONOMER SOLUTIONS
WITH HIGH (1.2 w/o) KOH CONCENTRATION
(Base 1 which contains 60.2 weight percent (w/o) water, 36.1 w/o acetonitrile, 2.4 w/o monomer (see FIG. 2 for list), 1.2 w/o KOH, and 0.015 w/o phase transfer agent = THAB); also see Examples 1–4.

| Monomer | $CO_2$ permeance stdcc/cm$^2$*sec*cmHg | $CO_2/CH_4$ selectivity |
|---|---|---|
| BA | 12E-06 | 22 |
| DHBP | 2.4E-06 | 32 |
| DHDPE | 8.2E-06 | 21 |
| BHPF | 1.8E-06 | 25 |
| TBBA | 12E-06 | 25 |
| TCHFBA | 230E-06 | 21 |
| TDP | 8.6E-06 | 27 |
| TMBA | 17E-06 | 35 |

[a]The selectivity reported is an average of 2 to 12 test results.

TABLE 5

$CO_2/CH_4$ SEPARATION RESULTS[a]
(MEMBRANES MADE FROM MONOMER SOLUTIONS
WITH LOW (0.24 w/o) KOH CONCENTRATION (BASE 2)
which contains 60.8 w/o $H_2O$, 36.5 w/o acetonitrile, 2.4 w/o monomer, 0.24 w/o KOH, and 0.015 w/o phase transfer agent = THAB);
also see Examples 1–4.

| Monomer | $CO_2$ permeance stdcc/cm$^2$*sec*cmHg | $CO_2/CH_4$ selectivity |
|---|---|---|
| BA | 2.0E-06 | 33 |
| BisF | 38E-06 | 1.2 |
| DHBP | 1.8E-06 | 53 |
| DHDPE | 21E-06 | 1.2 |
| SDP | 8.9E-06 | 2.7 |
| TBBA | 1.8E-06 | 48 |
| TDP | 2.0E-06 | 31 |
| TMBA | 1.0E-06 | 15 |

[a]The selectivity reported is an single test or the average of 2 to 8 test results.

TABLE 6

He/$CH_4$ SEPARATION RESULTS[a]
(MEMBRANES MADE FROM MONOMER SOLUTIONS
WITH HIGH (1.2 w/o) KOH CONCENTRATION (BASE 1)
which contains 60.2 weight percent (w/o) water, 36.1 w/o acetonitrile, 2.4 w/o monomer (see FIG. 2 for list), 1.2 w/o KOH, and 0.015 w/o phase transfer agent = THAB); also see Examples 1–4.

| Monomer | He permeance stdcc/cm$^2$*sec*cmHg | He/$CH_4$ selectivity |
|---|---|---|
| BA | 5.5E-06 | 15 |
| DHBP | 2.0E-06 | 27 |
| DHDPE | 4.3E-06 | 11 |
| BHPF | 1.9E-06 | 27 |
| TBBA | 3.0E-06 | 23 |
| TCHFBA | 69E-06 | 5.4 |
| TDP | 4.3E-06 | 14 |
| TMBA | 6.8E-06 | 14 |

[a]The selectivity reported is an average of 2 to 12 test results.

TABLE 7

He/CH$_4$ SEPARATION RESULTS[a]
(MEMBRANES MADE FROM MONOMER SOLUTIONS
WITH LOW (0.24 w/o) KOH CONCENTRATION (BASE 2)
which contains 60.8 w/o H$_2$O, 36.5 w/o acetonitrile, 2.4 w/o monomer,
0.24 w/o KOH, and 0.015 w/o phase transfer agent = THAB);
also see Examples 1-4.

| Monomer | He permeance stdcc/cm$^2$*sec*cmHg | He/CH$_4$ selectivity |
|---|---|---|
| BA | 2.8E-06 | 46 |
| BisF | 32E-06 | 1.0 |
| DHBP | 2.0E-06 | 57 |
| DHDPE | 22E-06 | 1.3 |
| SDP | 11E-06 | 3.4 |
| TBBA | 1.9E-06 | 49 |
| TDP | 4.2E-06 | 64 |
| TMBA | 2.2E-06 | 31 |

[a]The selectivity reported is a single test or the average of 2 to 8 test results.

Many other factors must be considered in producing this new polyester membrane system. The membranes must also be stable, have high flux, be relatively easy to manufacture, and be tough and easy to handle. Any of these factors may interfere with the commercial development and use of a new membrane. The ease of handling and stability is discussed below. One factor is the choice of quench solvents. This factor was discussed because early polyester membranes had interesting transport properties, but were brittle and difficult to handle.

Quench Solvents—The effects of many different quench solvents are examined. When the membranes are in the reaction dish, they are clear, tough, and flexible. If the membranes are quenched in water and dried, they become cloudy and brittle. In fact, water quenched membranes must be kept wet to avoid fracture during testing of physical and chemical properties.

TABLE 8

QUENCH SOLVENTS (TBBA)

| Solvent | CO$_2$/CH$_4$ Selectivity |
|---|---|
| water | 25 |
| hexane | 2 |
| acetonitrile | 38 |
| acetone | 15 |
| isopropyl alcohol | 32 |

Not wanting to be bound by theory, it appears that when the membranes are quenched in water, some reactants remain and/or many reactive end groups remain. During drying, these reactants or end groups continue to react, thus producing brittle films which crack and leak. In an attempt to stop the embrittlement, a series of TBBA films were quenched in various solvents. Some solvents destroyed the membranes. The CO$_2$/CH$_4$ selectivity factors for the successful membranes are reported in Table 8. The use of acetonitrile for the quench solvent produced the highest selectivities. This result may have occurred because all unreacted monomers are soluble in acetonitrile. When the membranes are quenched in acetonitrile, they are completely dried without damage and remain tough. Attempts to post react end groups did not achieve the expected stability in the membranes.

Compaction via High Pressure Treatment—In a real world application, it is likely that the feed gas in a separation system will be at high pressure. Under high pressure, the permeance of many membranes decreases due to compaction. If the flux of our membranes became significantly smaller under pressure, their utility is significantly impaired. A series of tests were carried out to determine if the interfacially polymerized membranes were susceptible to compaction.

UV Effects—The effect of unreacted acid chloride groups on the polyester and end groups resulting from partially unreacted DHBP is believed to reduce the film performance. A series of membranes was exposed to UV treatment in an effort to eliminate these groups. Five films were made from DHBP using the Base 2 sequence, and were treated with varying doses of UV in the presence of a non-aqueous solvent, e.g., acetonitrile. As usual, the feed gas composition was equal amounts of carbon dioxide, methane, and helium humidified to 50%, and the system pressure was 1 atm. The results are reported in Table 9. The film treated with 2 J/cm$^2$ had an increase in CO$_2$/CH$_4$ selectivity over the untreated film. Higher UV doses lower the selectivity. At 16 J/cm$^2$, the film was degraded enough to cause discloration and brittleness. The selectivity increase as a function of UV dose was due to a decrease in the CH$_4$ flux. The CO$_2$ flux was unchanged by UV treatment up to 2 J/cm$^2$. (See, for example, Rabek: *Mechanics of Photophysical Processes and Photochemical Reactions in Polymers*, John Wiley & Sons Ltd.; New York; 1978; 531).

TABLE 9

UV DOSAGE AND RESULTS WITH DHPB POLYESTER FILMS

| UV dosage J/cm$^2$ | CO$_2$/CH$_4$ | CO$_2$ Permeance stdcc/cm$^2$*sec*cmHg |
|---|---|---|
| no UV | 52 | 1.12E-06 |
| 2 | 78 | 1.40E-06 |
| 4 | 60 | 8.00E-06 |
| 8 | 12 | 2.75E-07 |
| 16 | brittle (unable to test) | |

The following Examples are presented for the purpose of illustration and description only. They are not to be construed as being limiting in any way or manner.

General—Materials Used
Solutions:

Base 1 contains 60.2 weight percent (w/o) water, 36.1 w/o acetonitrile, 2.4 w/o monomer (see FIG. 2 for list), 1.2 w/o KOH, and 0.015 w/o agent=THAB.

Base 2 contains 60.8 w/o H$_2$O, 36.5 w/o acetonitrile, 2.4 w/o monomer, 0.24 w/o KOH, and 0.015 w/o agent=THAB.

The acid solution is made up of 0.4 w/o 1,3,5-benzenetricarbonyl trichloride (trimesoyl chloride or TMC) in hexane.

The mechanical support is ALLTECH NYLON 66® membrane, 47 mm in diameter with 0.2 micron pore diameter, stock #2034. This support is believed to be Cuno Zetabind #NM827-02-020SP, available from Cuno located at 400 Research Parkway, Meriden, Conn. 06450.

EXAMPLE 1

FILM FORMATION BY INTERFACIAL POLYMERIZATION (a) The polymerization was carried out by pipeting a small amount of the disalt phenol solution (base solution) to a depth of about 5 mm into the bottom of a glass dish in which a NYLON 66® support membrane was placed. The TMC solution was carefully pipeted down the side of the dish to a depth of about 5 mm, thus minimizing the surface disturbance. Hexane is insoluble in the aqueous phase and floats on top of the solution. The TMC solution spreads to cover the entire surface of the base solution. The dish is covered to slow hexane evaporation. Formation of a film occurs immediately. Initially, only refraction patterns at the interface are seen. After about 3–10 min, wrinkles in the film are seen when the solutions are gently swirled. The thickness of the film is judged by watching the colors in the refraction patterns. When the colors from the refraction patterns are no longer visible (about 10–20 min), the film is removed from the dish by drawing the NYLON 66® support out of the solution. The polyester film is carried out of the solution on top of NYLON 66, which has a manufacturer's listed pore size of 0.2 microns. We determined the pore size to be closer to 1 micron with 65% porosity. The film is rinsed in DI water or acetonitrile, allowed to dry on a piece of filter paper, and loaded in a gas permeation test apparatus. The film is tested by flowing a humidified mixed gas stream, pressurized at 1 atm., over the top surface of the film while the bottom surface (permeate side) of the film is under vacuum. The permeate stream composition and volume is then determined by diverting it from the vacuum to a mass spectrometer.

The films are much less brittle when quenched in acetonitrile.

(b) In initial preparations, using Base 1 (described above), films formed in the dish then disappeared after 30 to 60 min, presumably due to hydrolysis. The hydrolysis was most apparent using the following monomers: BA, TDP, SDP, and BisK. Films made from other monomers were sticky on the base side and disappeared if left in contact with the base overnight. The rate of hydrolysis is probably proportional to the KOH concentration. Base 2 (described above) is near the minimum KOH concentration that will produce significant rates of polymerization. After switching to Base 2, the films were more stable and less sticky. The best membranes were clear, thick, and strong. There is very little difference in the measured pH of the two base solutions. The pH of either solution is above 13. However, the hydrolysis rate is dramatically reduced when Base 2 is used. The best membranes are flexible and able to withstand handling. The weakest membranes are cloudy or white and fractured easily. The characteristics of membranes formed from each monomer are summarized in Table 1 above.

EXAMPLE 2

COMPACTION STUDIES

Membranes were prepared from DHBP via the base 2 sequence described in FIG. 1B, quenched in acetonitrile, and dried. The permeance of nitrogen at high pressure was measured versus time. Nitrogen was selected because it probably would not plasticize or react with the polymer, thus complicating the interpretation of the results. Nitrogen was applied at 1200 psig, the highest pressure that could be achieved with present equipment. The nitrogen permeance versus time is shown in FIG. 3. The nitrogen permeance was not a function of time, indicating that these membranes are resistant to compaction at this pressure.

EXAMPLE 3

Plasticization by Carbon Dioxide

Carbon dioxide tends to plasticize many polymers at high pressures. Thus, plasticization often reduces gas selectivities to the point where the material is not useful in the intended application. These polyester membranes are good candidates for plasticization because of their polar nature. As a result, a plasticization test is critical in determining the utility of these novel membranes. However, the high degree of crosslinking might contribute to a significant resistance to plasticization.

A series of tests were carried out to determine if the interfacially polymerized membranes were indeed susceptible to carbon dioxide plasticization.

a) Membranes were made from DHBP via the Base 2 sequence of FIG. 1B, quenched in acetonitrile, and dried. In the first tests, two membrane samples were exposed to pure carbon dioxide at 600 psig. The results of this test are shown in FIG. 4. The permeance increases slightly at short times and does not significantly change thereafter. In a strongly plasticized system, the permeance would increase continually with time. This phenomenon was not observed with this polymer of DHBP.

b) Another test for plasticization is to test the separation factors for mixed gases in the presence of high pressure carbon dioxide. Because of experimental restrictions, these tests were limited to 600 psig total pressure. A 50/50 mixture of carbon dioxide and methane was used to measure selectivities versus total pressure and time. Again, the DHBP polymer membranes were tested. The resulting data are presented in FIG. 5.

c) At a given pressure, the selectivity was not found to change with time. However at a given time, the selectivity appeared to be a weak function of pressure. When the selectivity is a function of pressure, plasticization is always suspected. But leaks can also cause the selectivity to decrease with pressure. The data in FIGS. 4 and 5 strongly indicates that plasticization is not a major concern with these polyester membranes.

EXAMPLE 4

Higher Hydrocarbon Effects on Selectivity

In dealing with natural gas, the effect of trace amounts of higher hydrocarbons must be considered. It would be very undesirable if small concentrations of higher hydrocarbons such as ethane, propane, or butane altered the carbon dioxide/methane selectivity again through plasticization.

a) The experiment described above in Example 3 was repeated using the DHBP membrane, but small amounts of higher hydrocarbons were added to the feed. The feed gas consisted of 42% methane, 50% carbon dioxide, 7.5% ethane, 0.5% propane, and trace amounts of butane. As before, the total pressure was 600 psig. The results of this test are shown in FIG. 6. It appears that higher hydrocarbons do have an effect on the transport properties of our DHBP membrane. The carbon dioxide permeance increased with time by a factor of 50%. The carbon dioxide/methane selectivity decreased by 10%, and the carbon dioxide/ethane selectivity increased by 10%. The other gases were not observed in the permeate gas. The carbon dioxide/propane selectivity is believed to be very high.

EXAMPLE 5

MEMBRANE SUPPORT

Similarly, when the porous NYLON 66® support of Example 1(a) or 1(b) is replaced with a support of NYLON 6®, polyethylene, polypropylene, polyvinylene fluoride, poly(ether ether ketone) or poly(aryl sulfide) having a porosity comparable to NYLON 66®, an IFP membrane is produced.

EXAMPLE 6

SOLVENTS FOR ORGANIC PHASE

Similarly, when hexane in Example 1(a) or 1(b) is replaced by a comparable volume of pentane, a useful permeable membrane is obtained.

EXAMPLE 7

ORGANIC SOLVENTS FOR AQUEOUS PHASE

Similarly, when the acetonitrile solvent for the aqueous phase in Example 1(a) or 1(b), is replaced with 2-propanol, a useful permeable membrane is produced.

EXAMPLE 8

ACYL HALIDES

Similarly, when 1,3,5-benzene tricarbonyl chloride is replaced by a stoichiometrically equivalent amount of 1,2,4,5-benzene tetracarbonyl chloride, a corresponding useful permeable membrane is produced.

EXAMPLE 9

DIPHENOL

Similarly, when 4,4'-dihydroxy-diphenyl is replaced with 4,4'-isopropylidene bis-2,6-dibromophenol, a useful permeable membrane is obtained, see Tables 4, 5, 6 and 7.

EXAMPLE 10

TRIPHENOL

Similarly, when the 4,4'-dihydroxybiphenyl in Example 1(a) or 1(b) is replaced with a stoichiometrically equivalent amount of pyrogallol, hydroxyhydroquinone or phloroglucinol, a correspondingly useful permeable membrane is obtained.

EXAMPLE 11

INTERFACIAL POLYMERIZATION TEMPERATURE/CONCENTRATION/TIME CONDITIONS (a) Example 1(a) is performed using solution Base 1 wherein TMC is used in about a 1/1 ratio with the diphenol is 4,4'-dihydroxybiphenyl, the base solution solvent is acetonitrile, the organic solvent is hexane, the support is NYLON 66®. The reaction time is 30 min at ambient temperature (about 20° C.).

The membrane formed is quenched by contacting it with acetonitrile at 23° C. for about 0.1 min.

The quenched membrane is then dried overnight at ambient temperature 20° C. The membrane this formed has useful selective permeability characteristics.

EXAMPLE 12

UV CURING

The polymer membrane prepared by any of Examples 1–4 above is further treated with ultraviolet radiation in acetonitrile at ambient temperature in air using a 250 Watt medium pressure Hanovia Lamp. The amount of UV cure is 2 J/cm$^2$. The results are shown in Table 9 above for DHPB. For other polymer membranes, such as TBBA, similar UV treatment can improve selectivity.

While only a few embodiments of the invention have been shown and described herein, it will become apparent to those skilled in the art that various modifications and changes can be made in a crosslinked polyester gas separation membrane, its preparation by interfacial polymerization and its uses to separate mixtures of gases without departing from the spirit and scope of the present invention. All such modifications and changes coming within the scope of the appended claims are intended to be carried out thereby.

We claim:

1. A crosslinked polyester glassy polymer in the form of a membrane produced by interfacial polymerization, said polymer including $$-\overset{|}{A}-$$

trifunctional groups or $$-\overset{|}{\underset{|}{A^1}}-$$

tetrafunctional groups having the general structure:

(I)

or (II)

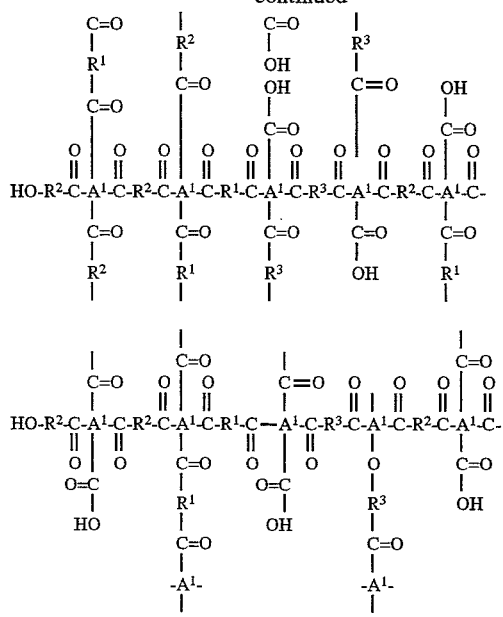

A is selected from the group consisting of:

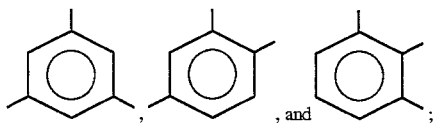

$A^1$ is selected from the group consisting of;

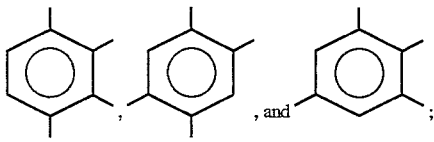

$R^1$, $R^2$, and $R^3$ are each independently selected from one or more difunctional aromatic groups —O—$Q^1$—O—, —O—$Q^2$—O—, or —O—$Q^3$—O—, wherein $Q^1$, $Q^2$, and $Q^3$ each independently contain 1–4 aromatic groups optionally connected by a direct bond, —CH$_2$—, C(CH$_3$)$_2$, C(CF$_3$)$_2$, —O—, —S—,

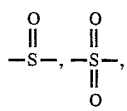

C═O, —N═N—, —CH═CH—, —C≡C—, —N(R$^{12}$)—, wherein R$^{12}$ is CH$_3$ or CH$_3$CH$_2$—, and

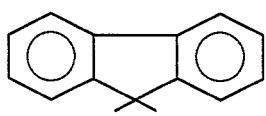

wherein the oxygen atoms are attached directly to the same or a different aromatic ring.

2. The crosslinked polyester glassy polymer of claim 1 wherein $R^1$, $R^2$, and $R^3$ are identical, and $Q^1$, $Q^2$, and $Q^3$ are identical.

3. The crosslinked polyester glassy polymer of claim 2 wherein the polymer is of structure I.

4. The crosslinked polyester glassy polymer of claim 3 wherein $R^1$, $R^2$, and $R^3$ are selected from the group consisting of —O—$Q^1$—O, —O—$Q^2$—O—, and —O—$Q^3$—O wherein each $Q^1$, $Q^2$, and $Q^3$ are each independently selected from:

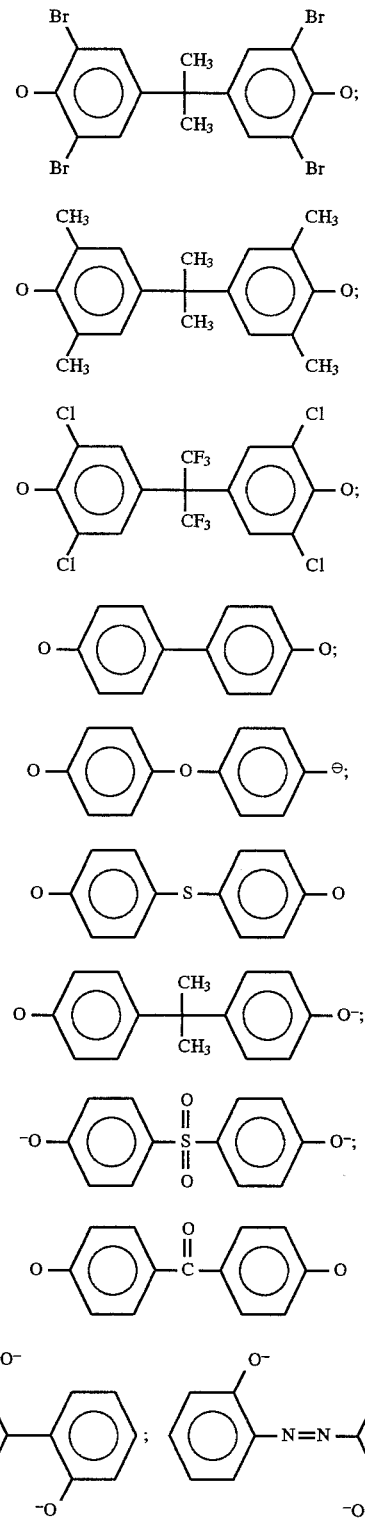

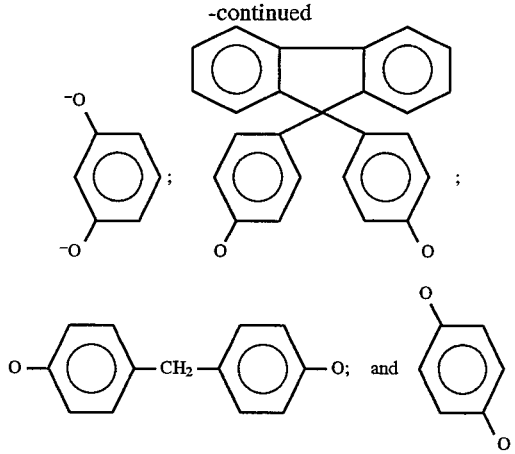

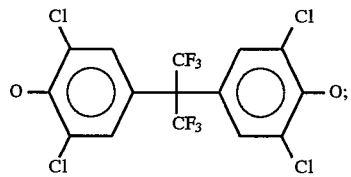

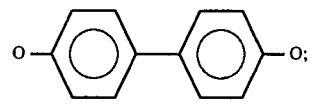

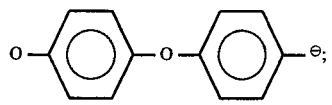

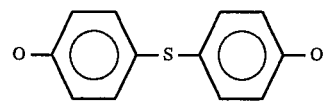

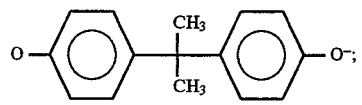

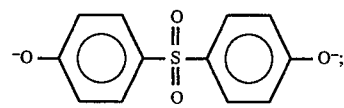

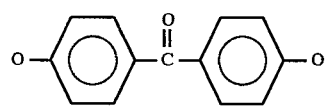

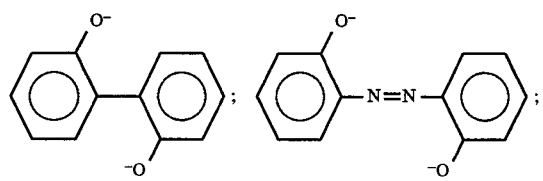

wherein

R$^4$, R$^5$, R$^6$, R$^7$, R$^8$, R$^9$, R$^{10}$, and R$^{11}$ are each independently selected from H, CH$_3$, CH$_3$CH$_2$, F, Cl, or Br; and wherein R$^4$, R$^5$, R$^6$, R$^7$, R$^8$, R$^9$, R$^{10}$, and R$^{11}$ are each independently selected from H, CH$_3$, CH$_3$CH$_2$, F, Cl, or Br; and Y is selected from the group consisting of a direct bond, —CH$_2$—, C(CH$_3$)$_2$, C(CF$_3$)$_2$, —O—, —S—, $-\overset{\overset{O}{\|}}{S}-$, $-\overset{\overset{O}{\|}}{\underset{\underset{O}{\|}}{S}}-$, C=O, —N=N—,

—CH=CH—, —C≡C—, —N(R$^{12}$)—, wherein R$^{12}$ is CH$_3$ or CH$_3$CH$_2$— and

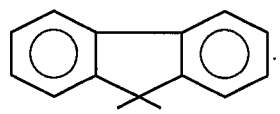

5. The crosslinked polyester glassy polymer of claim 4 wherein —O—Q$^1$—O—, —O—Q$^2$—O—, and —O—Q$^3$—O are selected from the group consisting of:

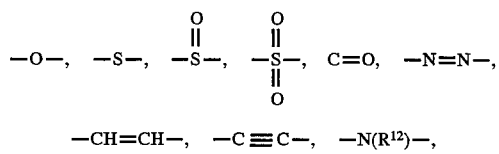

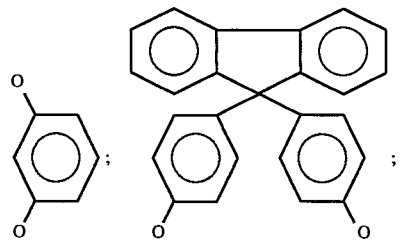

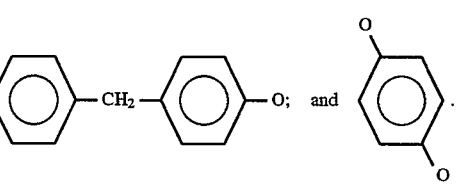

6. The crosslinked polyester glassy polymer of claim 4 wherein Q$^1$, Q$^2$, Q$^3$ are selected from the group consisting of

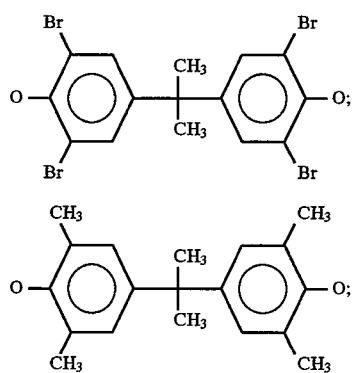

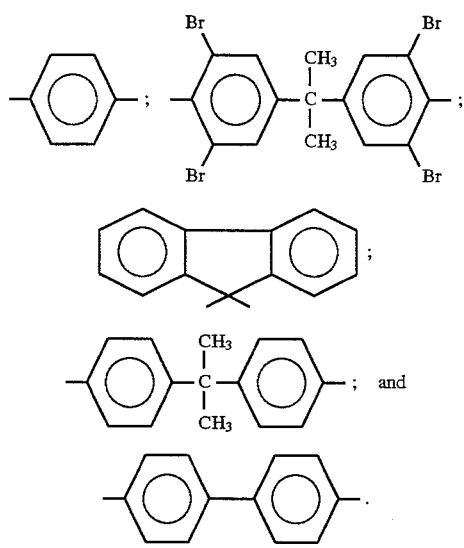

7. The crosslinked polyester glassy polymer of claim 2 wherein the polymer is structure II.

8. The crosslinked polyester glassy polymer of claim 7 wherein $R^1$, $R^2$, and $R^3$ are selected from the group consisting of $-O-Q^1-O-$, $-O-Q^2-O-$, and $-O-Q^3-O$ wherein each $Q^1$, $Q^2$, and $Q^3$ are each independently selected from:

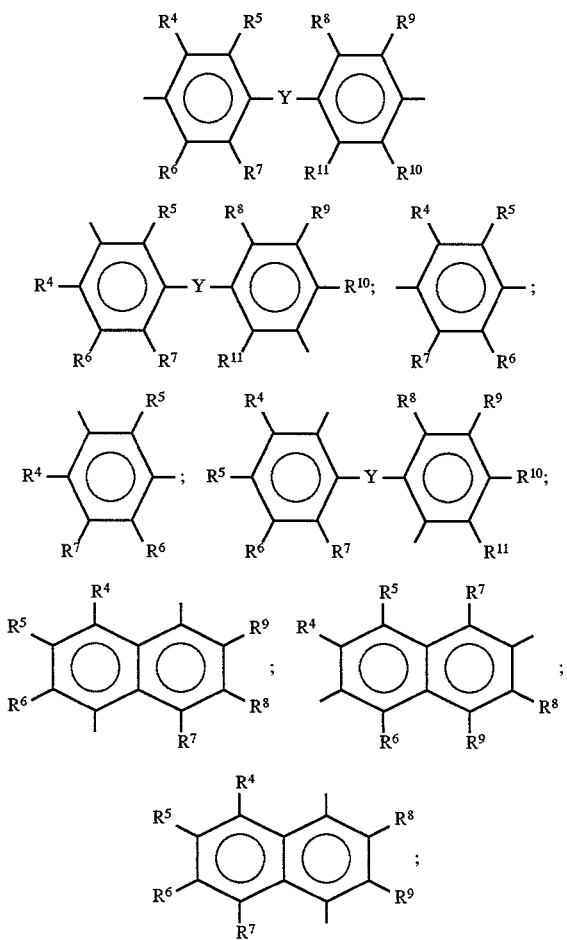

wherein $R^4$, $R^5$, $R^6$, $R^7$, $R^8$, $R^9$, $R^{10}$, and $R^{11}$ are each independently selected from H, $CH_3$, $CH_3CH_2$, F, Cl, Br; and Y is selected from the group consisting of a direct bond, $-CH_2-$, $C(CH_3)_2$, $C(CF_3)_2$,

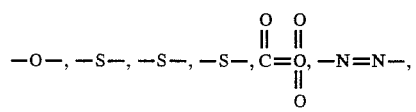

$-CH=CH-$, $-C\equiv C-$, $-N(R^{12})-$, wherein $R^{12}$ is $CH_3$ or $CH_3CH_2-$ and

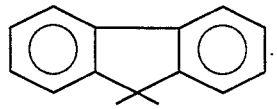

9. The crosslinked polyester glassy polymer of claim 8 wherein $O-Q^1-O-$, and $-O-Q^2-O-$, and $-O-Q^3-O$ are selected from the group consisting of:

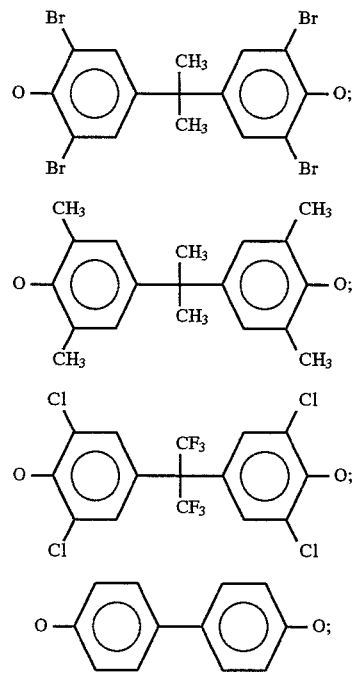

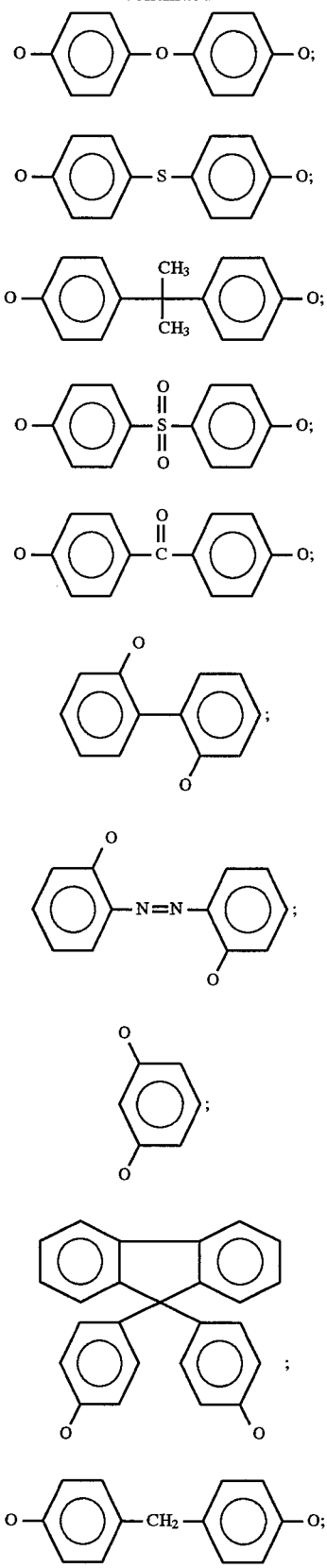

10. The crosslinked polyester glassy polymer of claim 9 wherein $Q^1$, $Q^2$, $Q^3$ are selected from the group consisting of

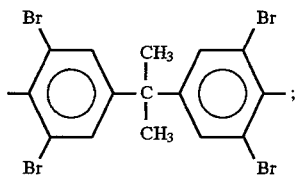

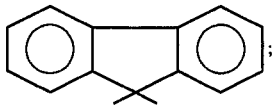

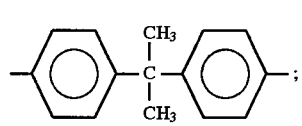

and

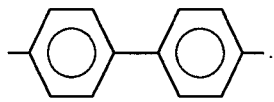

11. The crosslinked polyester glassy polymer of claim 1 wherein the polymer is in combination with a mechanical support structure.

12. A process for producing a gas permeable crosslinked polyester glassy polymer as a membrane, which process comprises:

(a) interfacially polymerizing:
(i) an essentially monomeric aromatic group containing reactant having two or more alkali metal substituted phenoxy functional groups per reactant molecule in a mixture of water, a water soluble polar organic solvent, and a phase transfer agent, and
(ii) an aromatic triacid trihalide selected from the group consisting of:

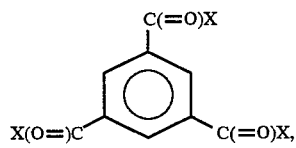

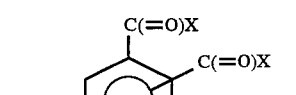

-continued and

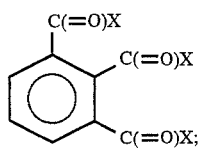

an aromatic tetraacid tetrahalide selected from the group consisting of:

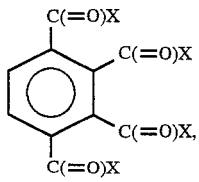

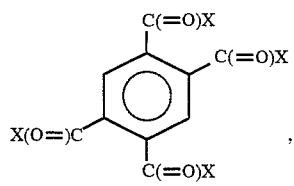

and

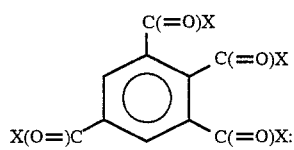

wherein X is chloro or bromo,
in one or more water insoluble nonpolar aprotic solvents at a temperature of between about 0° and 90° C. for between about 1 sec and 3 hr. in the presence of a phase transition catalyst, and (b) removing the crosslinked polyester glassy polymer membrane formed at the interface surface of the immiscible liquids formed in step (a);

(c) quenching the crosslinked polyester glassy polymer membrane formed in step (b) in one or more organic solvents optionally in the presence of water at ambient conditions for between about 0.1 sec and 1 min; and (d) drying the crosslinked polyester glassy polymer of step (c) at ambient temperature at between about 14–20 hr or at about 50°–120° C.

13. The process of claim 12 wherein the polymer has structure I.

14. The process of claim 13 wherein in step (a) $R^1$, $R^2$, and $R^3$ are selected from the group consisting of the polyalkali metal salts of —HO—$Q^1$—OH, —HO—$Q^2$—OH—, and —HO—$Q^3$—OH wherein each $Q^1$, $Q^2$, and $Q^3$ are each independently selected from:

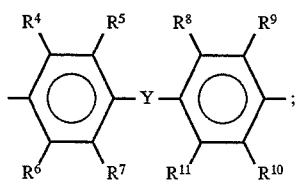

-continued

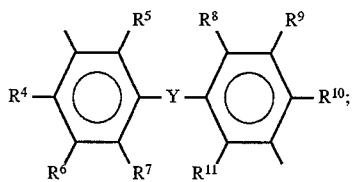

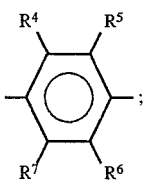

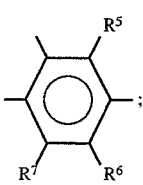

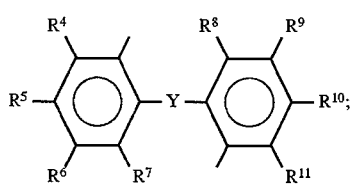

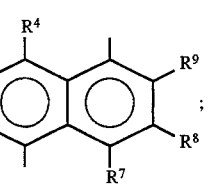

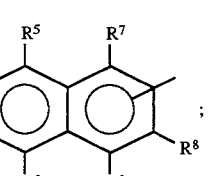

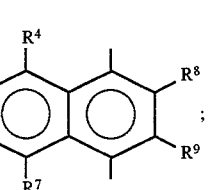

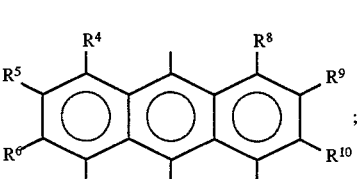

and

-continued

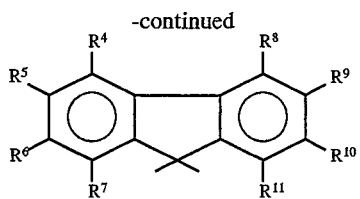

wherein $R^4$, $R^5$, $R^6$, $R^7$, $R^8$, $R^9$, $R^{10}$, and $R^{11}$ are each independently selected from H, $CH_3$, $CH_3CH_2$, F, Cl, or Br, and Y is selected from the group consisting of a direct bond, $-CH_2-$, $-C(CH_3)_2$, $-C(CF_3)_2$,

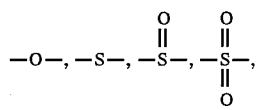

$=C=O$, $-N=N-$, $-CH=CH-$, $-C\equiv C-$, $-N(R^{12})-$, wherein $R^{12}$ is $CH_3$ or $CH_3CH_2-$ and

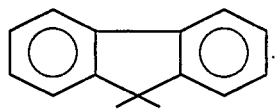

15. The process of claim 14 wherein the monomeric aromatic group containing reactant have two alkali metal substituted phenoxy functional groups per reactant molecule is selected from the alkali metal salts of difunctional phenols selected from the group consisting of:

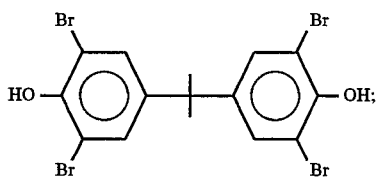

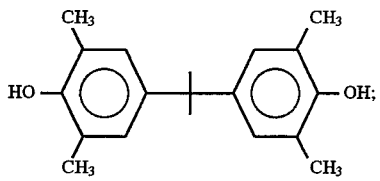

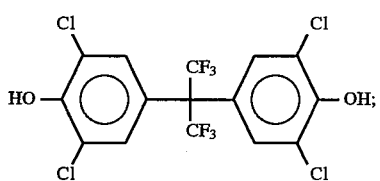

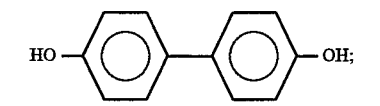

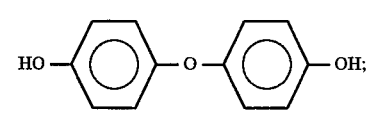

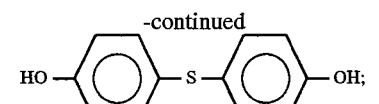

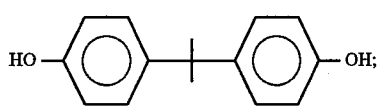

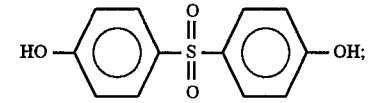

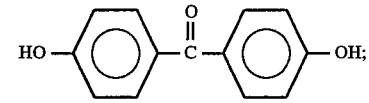

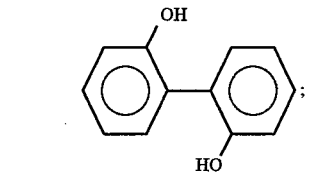

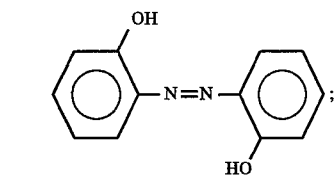

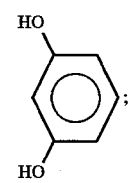

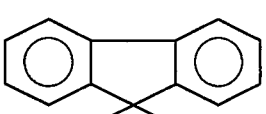

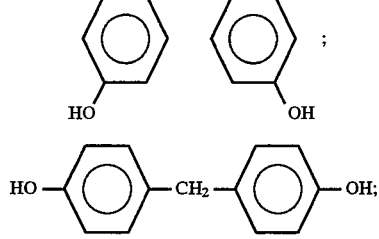

and

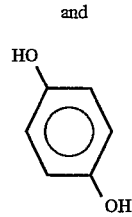

and X is chloro.

16. The process of claim 12 wherein $Q^1$, $Q^2$, $Q^3$ are selected from the group consisting of

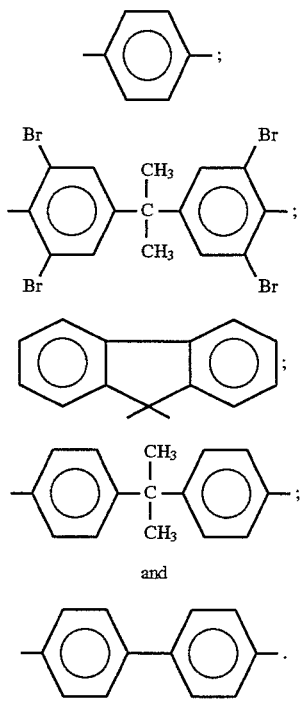

17. The process of claim 12 wherein step (a) is performed in the presence of a mechanical support at the interface and the polymer and support are present in steps (b), (c), and (d).

18. The process of claim 17 wherein $Q^1$, $Q^2$, $Q^3$ are selected from the group consisting of

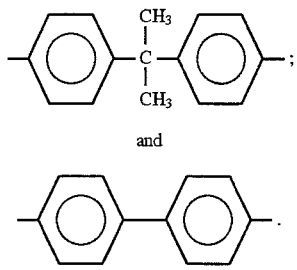

19. A process for the selective gas separation of a mixture of gases, which process comprises:

(a) contacting the mixture of gases under pressure with one surface of a membrane of the crosslinked polyester glassy polymer of claim 1; and (b) removing the gas which permeates selectively through the membrane.

20. The process of claim 18 wherein the mixture of gases in step (a) consists essentially of a mixture of gases selected from $CO_2$, $CH_4$, hydrogen, helium, nitrogen, oxygen, water, and $CH_3$—$CH_3$.

21. A process for the selective gas separation of a mixture of gases, which process comprises:

(a) contacting the mixture of gases under pressure with one surface of a crosslinked polyester glassy polymer membrane produced by the process of claim 12; and (b) removing the gas which permeates selectively through the membrane.

22. The process of claim 21 wherein the mixture of gases in step (a) consists essentially of a mixture of gases selected from $CO_2$, $CH_4$, hydrogen, helium, nitrogen, oxygen, water, and $CH_3CH_3$.

23. The process of claim 12 which further includes after step (d):

(e) contacting the crosslinked polyester glassy polymer membrane of step (d) in a non-aqueous solvent with ultraviolet radiation in the amount of between about 0.1 to 10 $J/cm^2$.

* * * * *